United States Patent
Nolan, Jr.

(10) Patent No.: US 11,208,054 B2
(45) Date of Patent: Dec. 28, 2021

(54) QUICK RELEASE REAR VIEW CAMERA SYSTEM

(71) Applicant: Toyota Motor Engineering & Manufacturing North America, Inc., Plano, TX (US)

(72) Inventor: Roger J. Nolan, Jr., Goodyear, AZ (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 0 days.

(21) Appl. No.: 16/822,966

(22) Filed: Mar. 18, 2020

(65) Prior Publication Data

US 2021/0291749 A1    Sep. 23, 2021

(51) Int. Cl.
| | |
|---|---|
| *B60R 11/04* | (2006.01) |
| *B60R 1/00* | (2006.01) |
| *B60R 16/023* | (2006.01) |
| *B62D 33/033* | (2006.01) |
| *H04N 5/225* | (2006.01) |
| *H04N 5/247* | (2006.01) |
| *H04N 7/10* | (2006.01) |
| *B60R 11/00* | (2006.01) |

(52) U.S. Cl.
CPC ............ *B60R 11/04* (2013.01); *B60R 1/00* (2013.01); *B60R 16/023* (2013.01); *B62D 33/033* (2013.01); *H04N 5/2253* (2013.01); *H04N 5/247* (2013.01); *H04N 7/10* (2013.01); *B60R 2011/004* (2013.01); *B60R 2011/0052* (2013.01); *B60R 2011/0078* (2013.01); *B60R 2300/105* (2013.01); *B60R 2300/30* (2013.01); *B60R 2300/8066* (2013.01)

(58) Field of Classification Search
None
See application file for complete search history.

(56) References Cited

U.S. PATENT DOCUMENTS

| | | | |
|---|---|---|---|
| 7,654,425 B2 | 2/2010 | Huang et al. | |
| 7,901,215 B1* | 3/2011 | Galgoci | B60Q 1/0088 439/34 |
| 8,044,776 B2 | 10/2011 | Schofield et al. | |
| 8,194,132 B2 | 6/2012 | Dayan et al. | |
| 9,403,491 B2 | 8/2016 | Happy et al. | |
| 9,619,718 B2 | 4/2017 | Michmerhuizen et al. | |
| 9,963,035 B2 | 5/2018 | Smith et al. | |
| 9,998,701 B2 | 6/2018 | Wada et al. | |

(Continued)

FOREIGN PATENT DOCUMENTS

WO    2018215369 A1    11/2018

*Primary Examiner* — Christopher G Findley
(74) *Attorney, Agent, or Firm* — Snell & Wilmer LLP

(57) ABSTRACT

Methods, systems, and apparatus for providing a view of an environment around a vehicle. The system includes a camera configured to detect image data of the environment around the vehicle. The system also includes an electronic control unit (ECU) coupled to the camera and configured to render an image based on the image data detected by the camera. The system also includes a display configured to display the image rendered by the ECU. The system also includes a connector coupling the camera and the ECU, the connector configured to be connected or disconnected at a location proximal to a cargo storage area of the vehicle.

18 Claims, 5 Drawing Sheets

(56) References Cited

U.S. PATENT DOCUMENTS

| | | |
|---|---|---|
| 10,418,757 B2 | 9/2019 | Kageta |
| 2006/0098094 A1 | 5/2006 | Lott |
| 2009/0096870 A1 | 4/2009 | Zheng |
| 2012/0218412 A1* | 8/2012 | Dellantoni ......... G01C 21/3602 |
| | | 348/148 |
| 2015/0172518 A1 | 6/2015 | Lucas et al. |
| 2016/0311375 A1 | 10/2016 | Biemer |
| 2016/0375829 A1 | 12/2016 | Lang et al. |
| 2020/0215990 A1* | 7/2020 | Grant ..................... B60R 11/04 |

\* cited by examiner

QUICK RELEASE REAR VIEW CAMERA SYSTEM

BACKGROUND

1. Field

This specification relates to a system and a method for releasing and adjusting cameras on an exterior of a vehicle.

2. Description of the Related Art

Many vehicles include at least one camera configured to detect image data and assist the driver in maneuvering the vehicle. A rear-facing back-up camera, for example, provides images of the rear of the vehicle for the driver to use while in reverse. The rear of the vehicle may be difficult for the driver to see, as there may be limited visibility out of the rear window of the vehicle and via the side mirrors. The images may be displayed on a display in the interior passenger cabin of the vehicle.

In some vehicles, such as trucks, the rear-facing back-up camera may be located on a tailgate of the truck. When the tailgate is down, or removed, the ability for the driver to benefit from the perspective of the back-up camera is mitigated or cancelled. In addition, disconnecting the camera from the vehicle when removing the tailgate is a complicated procedure. Thus, there is a need for improved camera and tailgate systems.

SUMMARY

What is described is a system for providing a view of an environment around a vehicle. The system includes a camera configured to detect image data of the environment around the vehicle. The system also includes an electronic control unit (ECU) coupled to the camera and configured to render an image based on the image data detected by the camera. The system also includes a display configured to display the image rendered by the ECU. The system also includes a connector coupling the camera and the ECU, the connector configured to be connected or disconnected at a location proximal to a cargo storage area of the vehicle.

Also described is a vehicle having a camera located on a tailgate and configured to detect image data of a surrounding environment. The vehicle also includes an electronic control unit (ECU) coupled to the camera and configured to render an image based on the image data detected by the camera. The vehicle also includes a connector coupling the camera and the ECU, the connector configured to be connected or disconnected at a location proximal to the tailgate.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for providing a view of an environment around a vehicle. Conventional vehicles having tailgates, such as trucks, require the user to disconnect the camera from the vehicle at a location underneath the vehicle in order to disconnect the tailgate from the vehicle. When the camera is not disconnected, the tailgate may not be fully removed. The ease of disconnecting the tailgate from the vehicle is hindered when the ability to disconnect the camera from the vehicle is difficult. Further, conventional methods of disconnecting a tailgate-attached camera from a vehicle are cumbersome and may require specialized skill.

The systems disclosed herein include a connector located at a more convenient location, such as near the hinge of the tailgate, so that disconnecting the camera from the vehicle when removing the tailgate is made simpler and safer. In addition, reconnecting the camera to the vehicle when reattaching the tailgate is also made simpler and safer.

The systems disclosed herein also include additional cameras located on an exterior of the vehicle. These additional cameras are easy to attach and remove from the exterior of the vehicle. These additional cameras may provide additional perspective for the driver to use when maneuvering the vehicle. In addition, these additional cameras may compensate for the removed tailgate-attached camera when the tailgate is disconnected from the vehicle.

Figure 1:
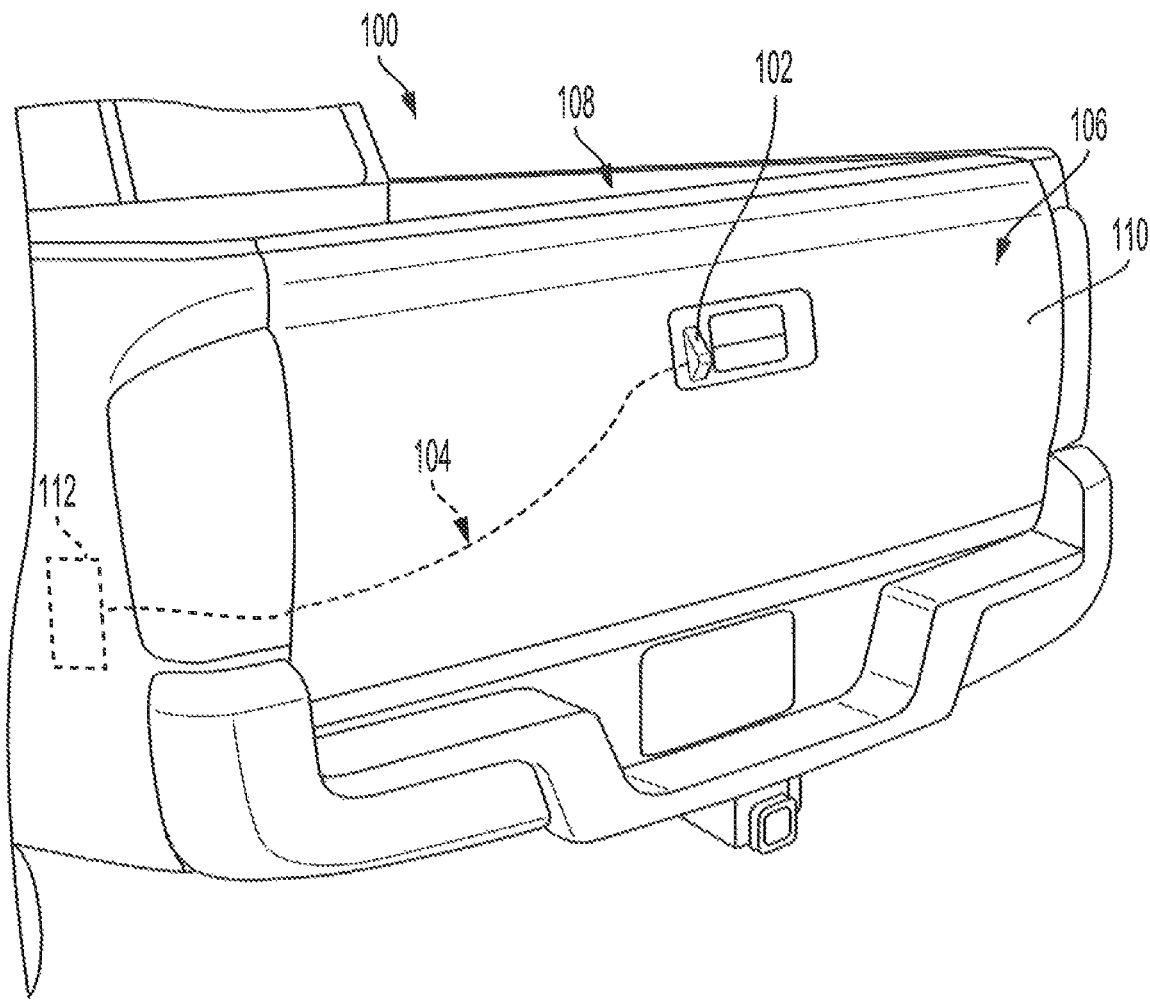
FIG. 1 illustrates a truck tailgate with a camera, according to various embodiments of the invention.

FIG. 1 illustrates a vehicle 100 having a tailgate 110 with a camera 102 located on the tailgate. The tailgate 110 is capable of being in a fully open position, a fully closed position, and any position therebetween. The fully open position may be a position where cargo is able to freely enter or exit the vehicle 100 along a horizontal plane, and the fully closed position may be a position where cargo is unable to freely enter or exit the vehicle 100 along the horizontal plane and the tailgate 110 is engaged with a locking or securing mechanism of the vehicle 100. As shown in FIG. 1, the tailgate 110 is in the fully closed position.

The vehicle 100 is a conveyance capable of transporting a person, an object, or a permanently or temporarily affixed apparatus. The vehicle 100 may have an automatic or manual transmission. The vehicle 100 may be a self-propelled wheeled conveyance, such as a car, sports utility vehicle, truck, bus, van or other motor or battery driven vehicle. For example, the vehicle 100 may be an electric vehicle, a hybrid vehicle, a plug-in hybrid vehicle, a fuel cell vehicle, or any other type of vehicle that includes a motor/generator.

The vehicle 100 may be capable of non-autonomous operation or semi-autonomous operation or autonomous operation. That is, the vehicle 100 may be driven by a human driver or may be capable of self-maneuvering and navigating without human input. A vehicle operating semi-autonomously or autonomously may use one or more sensors and/or a navigation unit to drive autonomously. As used herein, "driver" may refer to a human operating the vehicle 100 when the vehicle is operated in a non-autonomous mode. "Driver" may also refer to one or more computing devices (e.g., a computer processor, an electronic control unit) configured to operate the vehicle 100 when the vehicle is operated in an autonomous mode or a semi-autonomous mode.

The camera 102 of the vehicle 100 may be connected with a computing device 112 (e.g., a computer processor, an electronic control unit) of the vehicle 100 via a cable (or wire) 104. The computing device 112 may be one or more computing devices. The cable 104 may be connected to the camera 102 on a first end and connected to the computing device 112 on a second end. The cable 104 may be located within an interior cavity of the tailgate 110, the interior cavity defined by an outer panel 106 of the tailgate 110 and an inner panel 108 of the tailgate 110. That is, the cable 104 may be located between the outer panel 106 of the tailgate 110 and the inner panel 108 of the tailgate 110. The outer panel 106 may be facing away from the main body of the vehicle 100 and the inner panel 108 may be facing toward the main body of the vehicle 100. When the tailgate 110 is in the fully closed position, the camera 102 may detect image data associated with the environment behind the vehicle 100. This may be useful when the vehicle 100 is reversing, and the image data detected by the camera 102 may be provided to the driver of the vehicle to assist the driver of the vehicle in maneuvering the vehicle 100.

Figure 2A:
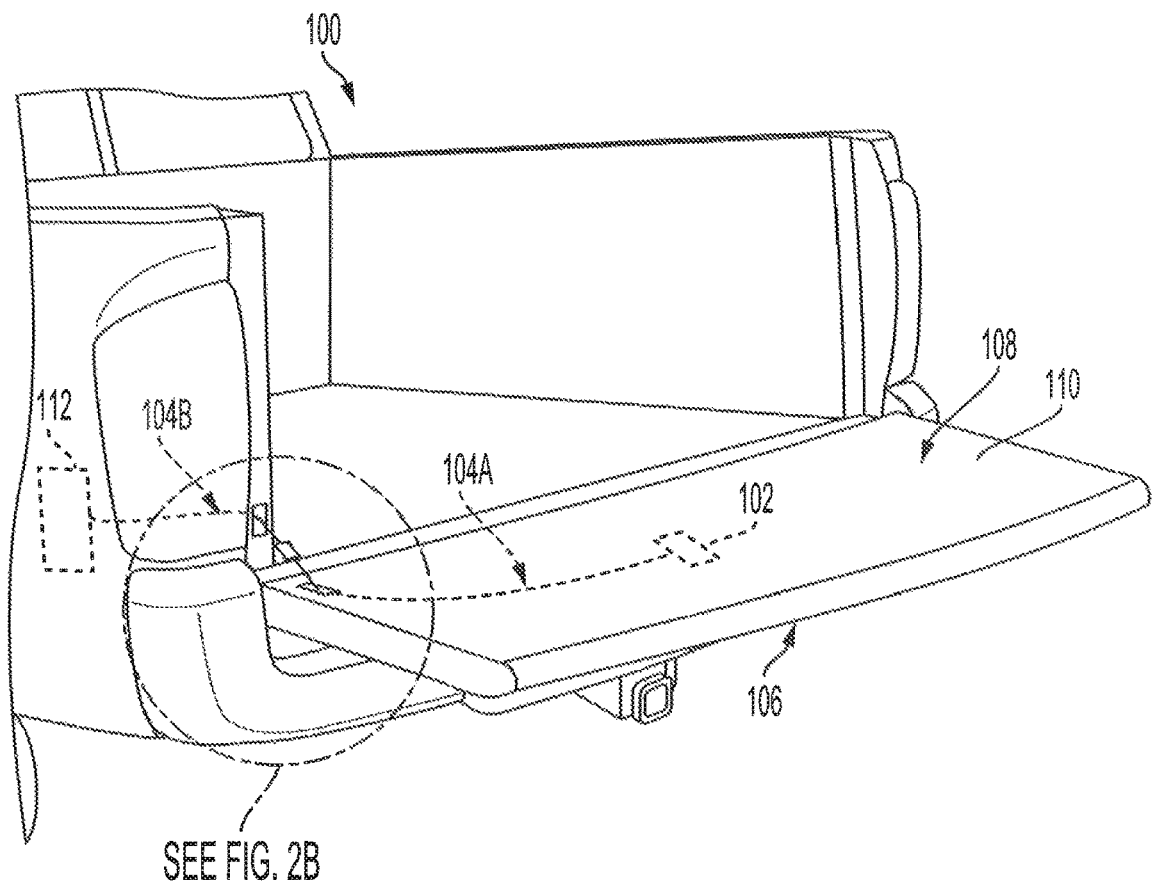
FIG. 2A illustrates an open truck tailgate, according to various embodiments of the invention.
Figure 2B:
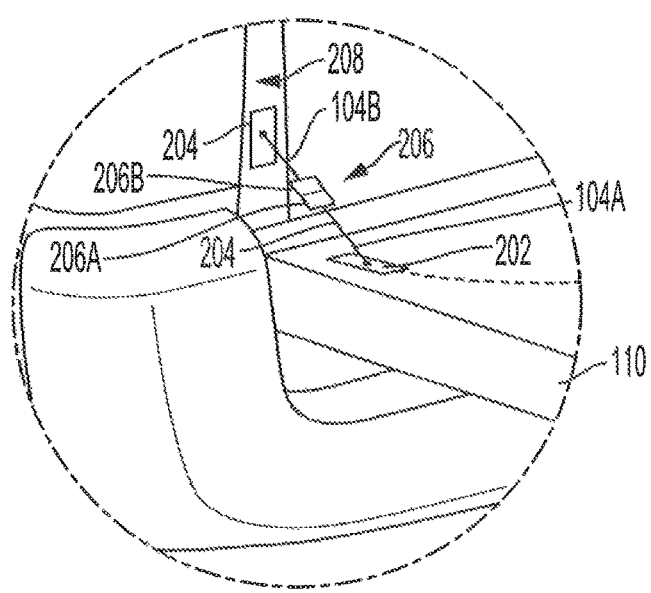
FIG. 2B illustrates a connector for the camera of the truck tailgate, according to various embodiments of the invention.

FIG. 2A illustrates the vehicle 100 with the tailgate 110 in the fully open position. FIG. 2B illustrates a connector 206 connecting the camera 102 to the computing device 112 of the vehicle 100. In particular, the cable 104 has a tailgate-side portion 104A and a body-side portion 104B. The tailgate-side portion 104A has a first end connected to the camera 102 and a second end connected to the tailgate-side portion 206A of the connector 206. The body-side portion 104B has a first end connected to the body-side portion 206B of the connector 206 and a second end connected to the computing devices 112 of the vehicle 100.

The tailgate-side portion 104A of the cable 104 may exit the interior cavity of the tailgate at a tailgate location 202. The body-side portion 104B of the cable 104 may exit an interior cavity of the vehicle body at a body location 204. The tailgate location 202 and the body location 204 may be sealed (e.g., via gaskets) to ensure liquid or debris do not enter the tailgate cavity or the vehicle body cavity, respectively.

The tailgate location 202 and the body location 204 may be aligned with each other, so that when the tailgate 110 is in the fully closed position (shown in FIG. 1), neither the cable 104 nor the connector 206 are exposed. Accordingly, the tailgate location 202 and the body location 204 may have depressions or indentations to form a cavity and receive and house the connector 206 and portions of the cable 104 when the tailgate 110 is in the fully closed position.

As shown in FIGS. 2A and 2B, the tailgate location 202 is on the inner panel 108 of the tailgate 110 and the body location 204 is along a rear gate of the vehicle cargo bed at a location that is covered by the tailgate 110 when the tailgate 110 is in the fully closed position. However, the tailgate location 202 and the body location 204 may be in any location proximal to the tailgate 110. For example, the body location 204 may be on a horizontal portion of the cargo bed and the tailgate location 202 is on the inner panel 108 of the tailgate 110. In another example, the body location 204 may be on a vertical side portion of the cargo bed and the tailgate location is on the inner panel 108 of the tailgate 110. A cover or shield may protect the connector 206 and cable 104 when the body location 204 and/or the tailgate location 202 are such that the connector 206 and cable 104 may be exposed when the tailgate 110 is in the fully closed or fully open positions.

In some situations, an owner of the vehicle 100 may desire to remove the tailgate 110 from the vehicle 100. In conventional vehicles, when the tailgate is removed from the vehicle and the tailgate has a camera, the connection between the tailgate camera and the vehicle must be disconnected. However, in conventional vehicles, this connection is located underneath the vehicle. Thus, there is significant hassle in getting on the ground and crawling underneath the vehicle to disconnect the camera from the vehicle. In addition, as it may be dark underneath the vehicle, even locating the connection between the camera and the vehicle may be a significant challenge.

In comparison, when the connector 206 is located near the tailgate 110 as shown in FIGS. 2A and 2B, the process of disconnecting the camera from the vehicle is made much simpler, much more convenient, and much safer.

Figure 3A:
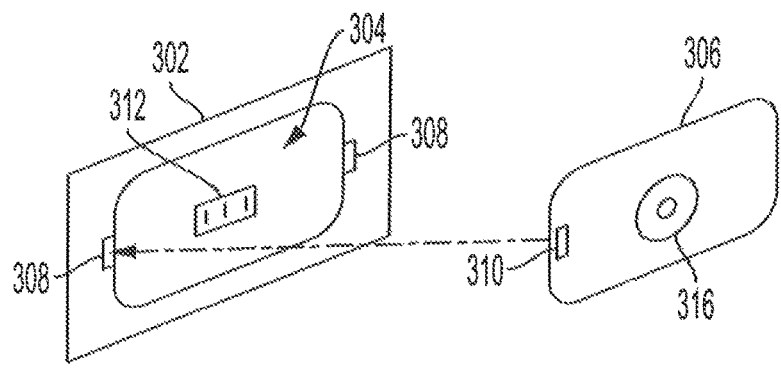
FIGS. 3A-3B illustrate an embodiment of a camera for an exterior of the vehicle, according to various embodiments of the invention.
Figure 3B:
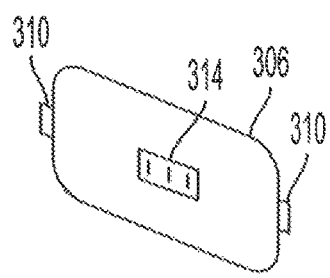

FIGS. 3A and 3B illustrate an embodiment of a camera that may be attached to the exterior of the vehicle 100. As shown in FIG. 3A, at an exterior location 302 located on an exterior surface of the vehicle 100, there may be a cavity 304 for receiving a camera 306. The camera 306 may include a lens (or image sensor) 316 for detecting image data. The camera 306 may also include protrusions 310 that correspond and mate to receivers 308 located proximal to the cavity 304.

When the camera 306 is placed in the cavity 304 and the protrusions 310 are aligned with the receivers 308 and force is applied to the camera 306 toward the cavity 304, the protrusions 310 may be received by the receivers 308. The receivers 308 may secure the camera 304 to the vehicle by grasping or securing the protrusions 310.

In addition, when the camera 306 is placed in the cavity 304, a body connector 312 may engage with a camera connector 314. The body connector 312 and the camera connector 314 may form an electrical connection when in contact. The camera 306 may transmit image data to the vehicle via the camera connector 314 and the body connector 312. The vehicle may transmit electrical energy to power the camera 306 and/or may transmit data to the camera 306 via the camera connector 314 and the body connector 312.

As shown, the camera connector 314 is on an opposite side of the camera 306 as the lens (or image sensor) 316. However, the camera connector 314 may be located on any portion of the camera 306, and the body connector 312 may be located in a corresponding location in the cavity 304.

Figure 4A:
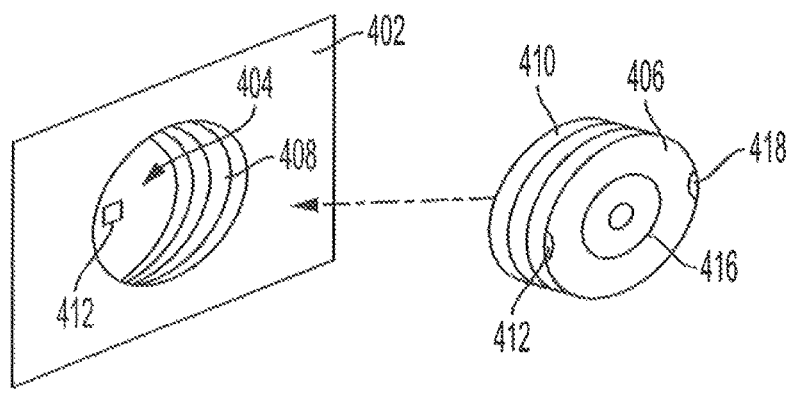
FIGS. 4A-4B illustrate an embodiment of a camera for an exterior of the vehicle, according to various embodiments of the invention.
Figure 4B:
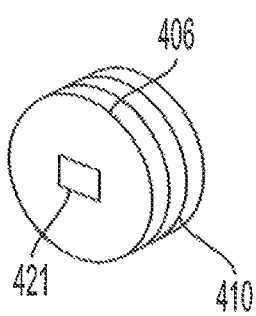

FIGS. 4A and 4B illustrate an embodiment of a camera that may be attached to the exterior of the vehicle 100. As shown in FIG. 4A, at an exterior location 402 located on an exterior surface of the vehicle 100, there may be a cavity 404 for receiving a camera 406. The camera 406 may include a lens (or image sensor) 416 for detecting image data. The camera 406 may also include threads 410 that correspond and mate to threads 408 located on an interior wall of the cavity 404. The threads 410 of the camera are located along a perimeter of the camera 406.

When the camera 406 is placed in the cavity 404, the camera 406 may be secured to the cavity 404 by spinning the camera 406 such that the threads 410 and the threads 408 engage each other. The threads 408 and the threads 410, when engaged with each other, secure the camera 404 to the vehicle. Depressions (or gripping regions) 418 formed on the perimeter of the camera 404 may be grasped by the user when spinning the camera 406 to secure the camera 406 to the cavity 404.

In addition, when the camera 406 is placed in the cavity 404, a body connector 412 may engage with a camera connector 414. The body connector 412 and the camera connector 414 may form an electrical connection when in contact. The camera 406 may transmit image data to the vehicle via the camera connector 414 and the body connector 412. The vehicle may transmit electrical energy to power the camera 406 and/or may transmit data to the camera 406 via the camera connector 414 and the body connector 412.

As shown, the camera connector 414 is on an opposite side of the camera 406 as the lens (or image sensor) 416. However, the camera connector 414 may be located on any portion of the camera 406, and the body connector 412 may be located in a corresponding location in the cavity 404.

The exterior locations 302, 402 may be anywhere on the vehicle 100. For example, below the tailgate, on a bumper, near the wheels, near the doors, above a rear window, to the left side of the rear window, to the right side of the rear window, in the interior of the cargo bed, on the left side of the vehicle, on the right side of the vehicle, on any of the doors of the vehicle, or on a front grille of the vehicle.

Figure 5:
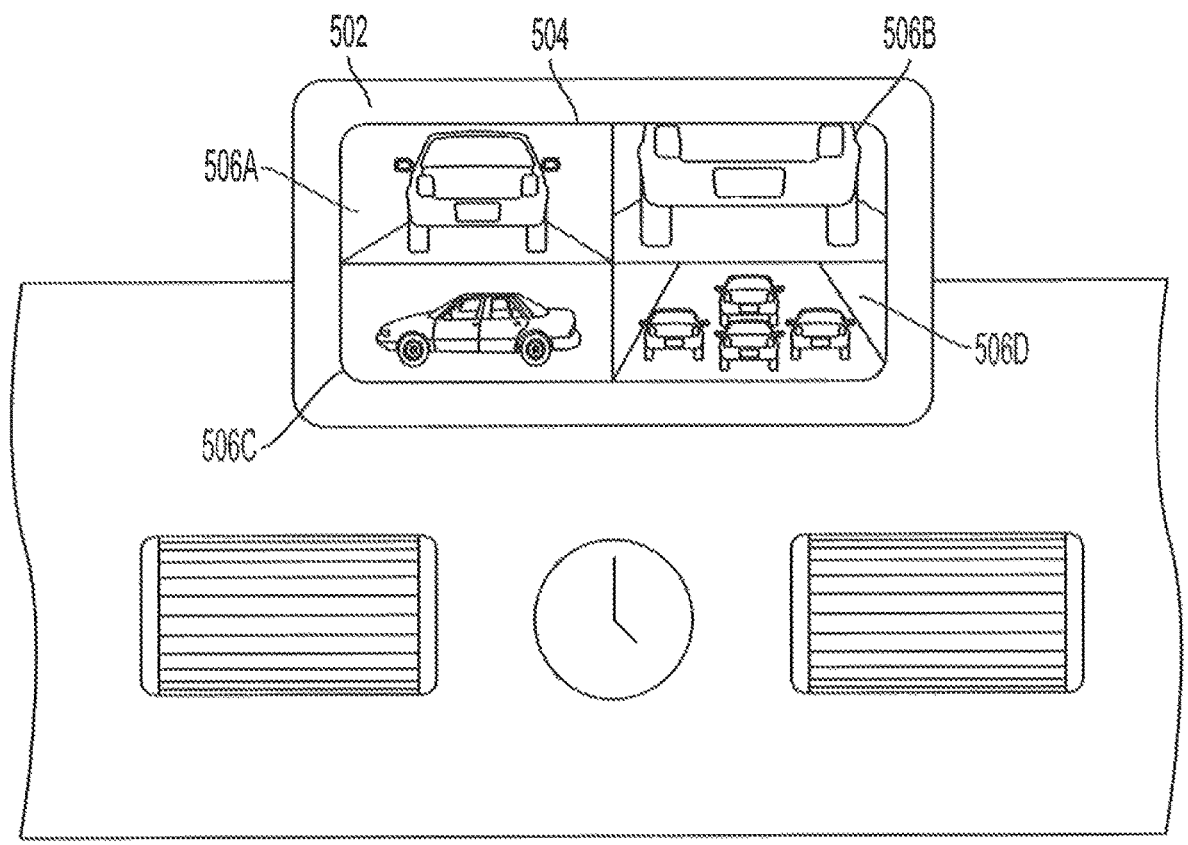
FIG. 5 illustrates a camera image viewing device, according to various embodiments of the invention.

FIG. 5 illustrates a display 502 within a vehicle (e.g., vehicle 100). The display 502 may be part of an infotainment unit of the vehicle. The display 502 may include a graphical user interface 504. The graphical user interface 504 may be rendered by one or more computer processors. The graphical user interface 504 may be rendered based on the image data received from one or more cameras attached to the vehicle.

As shown in FIG. 5, the graphical user interface 504 includes a first image 506A of a following vehicle located behind the subject vehicle. The first image 506A may be rendered using image data detected by a first camera. The graphical user interface 504 also includes a second image 506B of a detailed view of the following vehicle located behind the subject vehicle. The second image 506B may be rendered using image data detected by a second camera. The graphical user interface 504 also includes a third image 506C of a side vehicle located next to the subject vehicle. The third image 506C may be rendered using image data detected by a third camera. The graphical user interface 504 also includes a fourth image 506D of a zoomed-out view of multiple following vehicles located behind the subject vehicle. The fourth image 506D may be rendered using image data detected by a fourth camera.

The driver may select any of the images (e.g., images 506A-506D) to cause the images to be shown in a full-screen mode, or to cause details of the images to be provided, such as the location of the camera providing the image data for the image, or a power level of the camera, if the camera is battery-powered. Selection of the image may be performed using an input device, such as a touchscreen, a cursor, a button, a microphone configured to receive voice commands, or a camera configured to detect gestures.

In certain conditions, certain cameras may automatically be shown on the graphical user interface 504. For example, when the vehicle is travelling off-road, cameras located near the tires may automatically be shown, as the driver may be interested in the traction conditions of each tire. Whether the vehicle is travelling off-road may be detected via a user input (e.g., touchscreen selection, driving mode button selection, voice selection) or the off-road condition may be automatically detected based on location data of the vehicle and map data. In addition, image data from the cameras may be used to determine an environment of the vehicle. For example, when may rocks and dirt roads are detected based on the detected image data, an off-road condition may be automatically determined. Machine learning techniques and training data may be used to facilitate the image data based determination.

Figure 6:
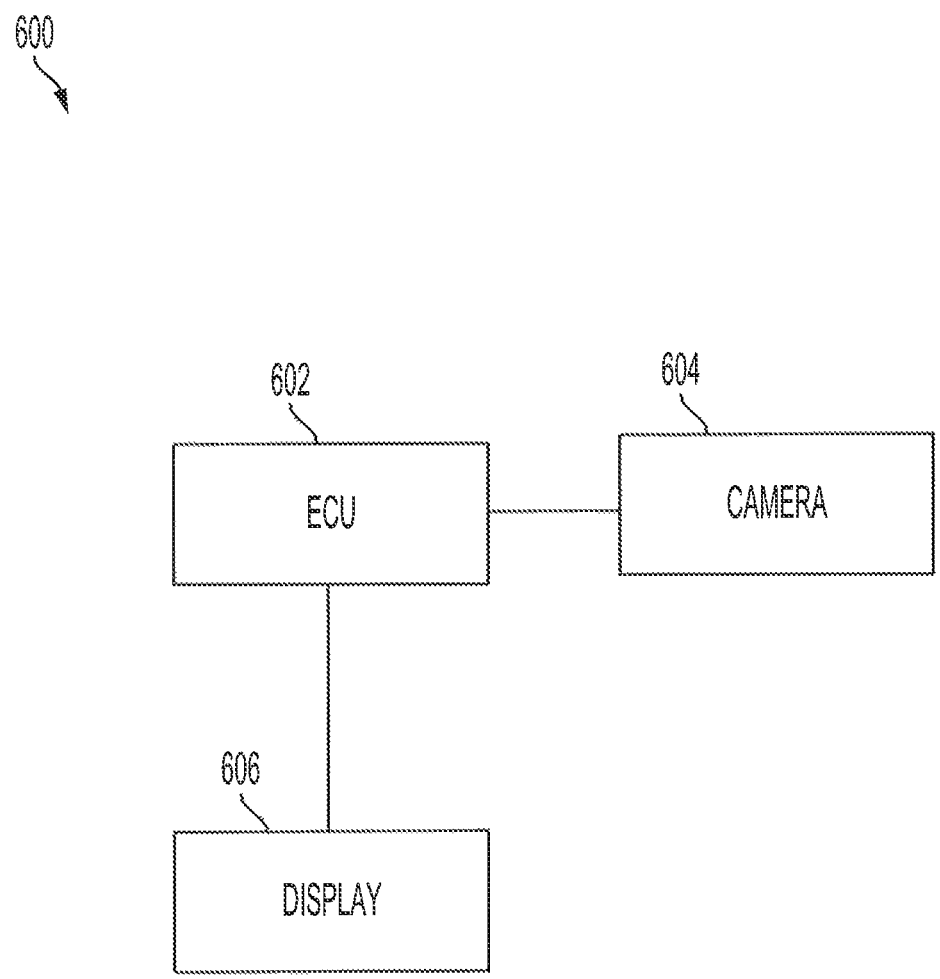
FIG. 6 illustrates a block diagram of the system, according to various embodiments of the invention.

FIG. 6 illustrates a block diagram of an exemplary system, according to embodiments of the invention.

The system 600 includes an electronic control unit (ECU) 602. The ECU 602 may be more than one ECU, each appropriately programmed, to control one or more operations of the vehicle. The ECU 602 may be electrically coupled to some or all of the components of the vehicle. In some embodiments, the ECU 602 is a central ECU configured to control one or more operations of the entire vehicle. In some embodiments, the ECU 602 is multiple ECUs located within the vehicle and each configured to control one or more local operations of the vehicle. In some embodiments, the ECU 602 is one or more computer processors or controllers configured to execute instructions stored in a non-transitory memory.

The system 600 also includes a camera 604 (e.g., camera 102, 306, 406). The camera 604 may be one or more cameras, as described herein, configured to detect image data. The cameras 604 may be located anywhere along the exterior of the vehicle, within the passenger cabin of the vehicle, or in a cargo area of the vehicle. The cameras 604 may be connected to the ECU 602 wirelessly or via wires or cables, as described herein. When the camera 604 are connected to the ECU 602 wirelessly, the camera 604 and the ECU 602 may be connected to respective transceivers configured to communicate data.

The system 600 also includes a display 606 (e.g., display 502). The display 606 may be configured to display a graphical user interface rendered by the ECU 602, as described herein. The graphical user interface may show images based on image data detected by the camera 604.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for providing a view of an environment around a vehicle, the system comprising:
a first removable camera positioned on a tailgate of the vehicle and configured to detect image data of the environment around the vehicle;
a second removable camera that is recessed within a cavity on an exterior of the vehicle and that is flush with the exterior of the vehicle, the second removable camera being configured to detect image data of the environment around the vehicle;
an electronic control unit (ECU) coupled to the first removable camera and the second removable camera and configured to render an image based on the image data detected by the first removable camera and the second removable camera;
a display configured to display the rendered image; and
a connector configured to couple the first camera to the ECU and to be connected or disconnected at a location proximal to a cargo storage area of the vehicle.

2. The system of claim 1, wherein the tailgate is configured to prevent cargo in the cargo storage location from being removed from the vehicle, wherein the connector is located proximal to the tailgate.

3. The system of claim 2, further comprising a cable having a body-side portion and a tailgate-side portion, the body-side portion connecting the ECU to the connector and the tailgate-side portion connecting the first removable camera to the connector.

4. The system of claim 3, wherein the connector has a body-side portion and a tailgate-side portion.

5. The system of claim 3, wherein the tailgate-side portion of the cable is located in an interior cavity of the tailgate.

6. The system of claim 5, wherein the tailgate-side portion of the cable is located between an outer panel of the tailgate and an inner panel of the tailgate.

7. The system of claim 6, wherein the tailgate-side portion of the cable exits the interior cavity of the tailgate at a tailgate location on the inner panel of the tailgate.

8. The system of claim 7, wherein the body-side portion of the cable exits an interior cavity of a body of the vehicle at a body location, and
wherein the tailgate location and the body location align when the tailgate is in a fully closed position.

9. The system of claim 8, wherein the tailgate location and the body location form a cavity when the tailgate is in the fully closed position, the cavity configured to house the connector and a portion of the cable.

10. The system of claim 2, wherein the tailgate is configured to be removed from the vehicle,
wherein the connector is disconnected when the tailgate is removed from the vehicle, and
wherein the location of the connector is not underneath the vehicle.

11. The system of claim 1, wherein the second removable cameras includes one or more protrusions corresponding to a receiver located on the exterior of the vehicle, the receiver being configured to secure the second removable camera to the vehicle by grasping or securing the one or more protrusions.

12. The system of claim 1, wherein the second removable cameras includes threads along a perimeter corresponding to threads located along an interior wall of the cavity located on the exterior of the vehicle, the threads being configured to engage with each other to secure the second removable camera to the vehicle.

13. The system of claim 1, wherein the second removable camera is configured to compensate for the first removable camera when the tailgate is disconnected from the vehicle.

14. A vehicle comprising:
a camera located on a tailgate and configured to detect image data of a surrounding environment;
an electronic control unit (ECU) coupled to the camera and configured to render an image based on the image data detected by the camera; and
a connector coupling a tailgate-side cable portion coupled to the camera and a body-side cable portion coupled to the ECU, the tailgate-side cable portion exiting an interior cavity of the tailgate at a tailgate location on an inner panel of the tailgate, the body-side cable portion exiting an interior cavity of a body of the vehicle at a body location, and the tailgate location and the body location aligning to form a housing to surround the connector when the tailgate is in the fully closed position and exposing the connector when the tailgate is in an open position.

15. The vehicle of claim 14, wherein the connector has a body-side portion and a tailgate-side portion.

16. The vehicle of claim 14, wherein the tailgate-side cable portion is located in the interior cavity of the tailgate, between an outer panel of the tailgate and the inner panel of the tailgate.

17. The vehicle of claim 14, wherein the tailgate is configured to be removed from the vehicle,
wherein the connector is disconnected when the tailgate is removed from the vehicle, and
wherein the location of the connector is not underneath the vehicle.

18. The vehicle of claim 14, further comprising additional cameras configured to provide additional image data for displaying by a display, the additional cameras being removably attached to an exterior of the vehicle via sets of protrusions and receivers or sets of threads.

* * * * *